United States Patent Office 2,879,260
Patented Mar. 24, 1959

2,879,260

POLYMERS FROM 3,5-DIMETHYL-5-HYDROXY-2-HEXENOIC ACID, 5-LACTONE AND POLYHYDROXY COMPOUNDS

John R. Caldwell and James C. Martin, Kingsport, Tenn., assignors to Eastman Kodak Company, Rochester, N.Y., a corporation of New Jersey No Drawing. Application June 7, 1956
Serial No. 589,872

9 Claims. (Cl. 260—78.3)

This invention relates to novel synthetic resins and to a process for their preparation which comprises (1) reacting the 5-lactone of 3,5-dimethyl-5-hydroxy-2-hexenoic acid with a polyhydric alcohol such as ethylene glycol, glycerine, sorbitol monoacetate, diethyl ether of mannitol, etc. in the presence of an acidic esterification catalyst and then (2) adding a polymerization catalyst of the type used in the melt polymerization of olefinically unsaturated organic compounds and heating at an elevated temperature until a solid synthetic resin is produced. The products can be employed in protective coating compositions, wrapping materials, containers, impregnating materials for fabrics, etc.

It is known that β-propiolactone can be reacted with a polyhydric alcohol and cured to form a synthetic resin. However, other β-lactones cannot be employed to satisfactorily produce synthetic resins. It is also known that a reaction product can be produced by first condensing acrolein and ketene and then reacting the condensation product with glycerine and other polyhydroxy compounds. However, the above and other related synthetic resinous compositions do not fulfill all of the desirable requirements of a synthetic resin which is to be used for protective coatings, films, sheets, containers, etc.

We have now discovered that a synthetic resin can be produced by (1) reacting the 5-lactone or 3,5-dimethyl-5-hydroxy-2-hexenoic acid with a polyhydric alcohol in the presence of an acidic esterification catalyst and then (2) adding a polymerization catalyst of the type which can be employed in the melt polymerization of olefinically unsaturated organic compounds accompanied by heating so as to produce a solid product which is unusually tough and especially suited for use under conditions involving extensive wear and tear.

In addition to the improvement in the quality of the materials produced in accordance with this invention, it is also evident that the composition is fundamentally different from related compositions in the prior art because a delta lactone is employed. Since it is well known that β-lactones are more reactive toward hydroxyl groups than are the delta lactones, it is evident that the process according to this invention was totally unexpected.

It is an object of this invention to provide novel synthetic resins which are exceptionally tough and can be employed under conditions where they are subjected to extensive wear and tear.

It is another object of this invention to provide synthetic resins derived from the 5-lactone of 3,5-dimethyl-5-hydroxy-2-hexenoic acid and a polyhydric alcohol.

It is a further object of this invention to provide a process for preparing such synthetic resins.

It is a still further object of this invention to provide sheets and films of these novel synthetic resins which can be employed as protective coatings, wrapping materials, etc., and which can be used in forming containers, packages, various articles, and the like.

It is an additional object of this invention to provide fabrics which contain impregnated synthetic resinous products produced in accordance with this invention.

Other objects will appear hereinafter.

According to a preferred embodiment of this invention, there is provided a process for preparing a synthetic resin comprising the two steps of (1) reacting the 5-lactone of 3,5-dimethyl-5-hydroxy-2-hexenoic acid having the following formula:

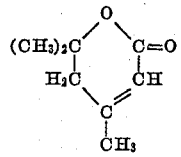

which can also be represented as follows:

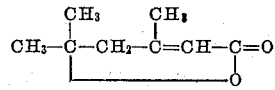

with a polyhydric alcohol containing from 2 to 6 free hydroxyl radicals and containing from 2 to 6 carbon atoms employing an acidic esterification catalyst; and step (2), adding a polymerization catalyst of the type used for polymerizing ethylenically unsaturated organic compounds and heating at an elevated temperature until a solid synthetic resin is produced.

The polyhydric alcohols which can be employed in accordance with this invention include those organic compounds having hydroxyl groups attached to carbon atoms having no benzenoid unsaturation bonded thereto. In other words, phenols such as resorcinol, etc., are not intended to be included within the scope of the polyhydric alcohols used in accordance with this invention. It is advantageous that the polyhydric alcohols employed have at least two free hydroxyl groups or that any substituent which might be chemically bound to a hydroxyl group so as to prevent the presence of two free hydroxyl groups is only loosely bound to such a hydroxyl group in such a way that it will be removed during the preparation of the synthetic resin being produced in accordance with the invention.

It is generally preferred to employ a polyhydric alcohol selected from the group consisting of aliphatic polyhydric alcohols containing from 2 to 6 free hydroxyl groups and containing from 2 to 6 carbon atoms. Of course, equivalents of this preferred group are also contemplated within the scope of the invention. Included within the preferred group are the aliphatic monocarboxylic acid esters of these polyhydric alcohols, said esters having from 2 to 5 free hydroxyl groups, the monocarboxylic acid radical containing from 2 to 18 carbon atoms. Also included within the preferred group are the alkyl ethers of the aliphatic polyhydric alcohols, said ethers having from 2 to 5 free hydroxyl groups, the alkyl group containing from 1 to 8 carbon atoms. Also included within the preferred group are the mixed alkyl ether-aliphatic monocarboxylic acid esters of the aliphatic polyhydric alcohols, said ether-esters having from 2 to 4 free hydroxyl groups, the alkyl groups containing from 1 to 8 carbon atoms and the monocarboxylic acid radicals containing from 2 to 18 carbon atoms. Specific examples of some of the polyhydric alcohols which can be employed include ethylene glycol, glycerol, pentaerythritol, sorbitol, glucose, diethylene glycol, 1,3-propylene glycol, hexane-1,4-diol, pentane-1,5-diol, diglycerine, mannitol, glycerine monomethyl ether, sorbitol dibutyl ether, mannitol triethyl ether, glycerine monoacetate, glycerine monobutyrate, glycerine monostearate, sorbitol mono-oleate, mannitol dilaurate, sorbitol monomethyl ether diacetate, mannitol monobutyl ether distearate, etc.

The first step wherein the δ-lactone of 3,5-dimethyl-5-hydroxy-2-hexenoic acid is condensed with a polyhydric alcohol using an acidic esterification catalyst can be performed with or without a solvent at a temperature which is determined by whatever solvent may be present and the efficiency of the acidic esterification catalyst which is employed. The stronger the acidic catalyst used, the lower the reaction temperature which can be employed. There is no clearly defined range of temperatures which are particularly advantageous; however, temperatures are generally preferred which lie within the range of 70°–220° C. It is obviously possible to employ lower temperatures as well as higher temperatures although the rapidity of the reaction will be adversely affected by low temperatures and some undesirable side reactions may take place at excessively high temperatures.

As mentioned, the first step of the process can be carried out with or without a solvent. Suitable solvents which can be advantageously employed are those in which the polyhydric alcohol and the lactone are both soluble but which are inert to the reactants and do not adversely affect the reaction. Examples of such solvents are lower dialkyl ethers, 1,4-dioxane, benzene, toluene, xylene, various aliphatic hydrocarbons, especially when chlorinated, etc.

The catalysts which can be employed in the first step of the process are those acidic esterification catalysts which are well known in the art and include sulfuric acid, p-toluene sulfonic acid, zinc chloride, boron trifluoride, phosphoric acid, etc. Although any of the acidic esterification catalysts which are commonly employed in the art can be used in accordance with this invention, it is preferred to employ those which are relatively strong acids. The examples just given are illustrative of such relatively strong acids which are especially advantageous. As previously mentioned, when such a strongly acidic esterification catalyst is employed, it is generally possible to employ a fairly low reaction temperature during the first step.

The amount of acidic esterification catalyst which can advantageously be employed is not especially critical. The quantity can be varied in accordance with the other conditions involved. It is generally advantageous to employ from about 0.1% to about 2% by weight of the catalyst based upon the combined weight of the lactone and the polyhydric alcohol. As already indicated, larger or smaller quantities can also be employed, e. g. 0.005% or 5%.

Generally, it is advantageous to employ at least one molecular equivalent of the lactone for each available free hydroxyl group in the polyhydric alcohol. For example, when the lactone is condensed with glycerine, three mols of the lactone are advantageously used for each mol of glycerine. It is not essential however that all available hydroxyl groups in the polyhydric alcohol be reacted with the lactone. It is possible in actual practice to use from about 0.5 to 1.5 mol proportions of the lactone for each mol proportion of hydroxyl groups in the polyhydric alcohol. Most advantageously this range is from about 0.9 to 1.1. Preferred embodiments of this invention employ 1 mol of the lactone for each mol proportion of hydroxyl groups in the polyhydric alcohol, then since the number of free hydroxyl groups is from 3 to 6, this gives an overall preferred range of from 2 to 6 mols of lactone for each mol of polyhydric alcohol.

Step (1) of the process is preferably conducted for a period of time sufficient to remove substantially all of the water which may be formed during the course of the reaction. This can generally be accomplished within a few hours employing apparatus and techniques which are well known to those acquainted with reactions of this general type.

After step (1) has been brought to substantial completion, a polymerization catalyst is added to the reaction product in order to carry out step (2) which is performed at an elevated temperature. It is not necessary to allow the product of step (1) to cool to room temperature since step (2) can be performed at from about 100°–150° C. without significant interruption following step (1).

Step (2) can be referred to as the curing step wherein the reaction product of step (1) is polymerized, cross-linked and otherwise converted to a solid thermoset product which is insoluble in most organic solvents.

After step (1) has been completed and prior to adding the polymerization catalyst for step (2), various pigments, fillers, plasticizers, drying oils, alkyd resins, soluble polyesters, olefinically unsaturated polymerizable organic compounds, antioxidants, dyes, modifiers, etc. can be added to the reaction mixture, provided that they do not unduly interfere with the curing process which is accomplished by step (2). Alternatively, such additives can in some instances be incorporated into the reaction mixture during the curing step at any time while it is physically possible to do so. Of course, much less desirably, such materials can be incorporated into the final product by various techniques known in the art.

Included among the materials which can be incorporated into the reaction mixture at the end of step (1) are the ethylenically unsaturated polymerizable compounds which include the acrylates, methacrylates, fumarates, alkenyl nitriles and other unsaturated polymerizable compounds which boil at relatively high temperatures and would not be lost in excessive quantities during the carrying out of the second step of the process. Some of the more preferred examples of these products are described in U. S. Patent 2,455,731, granted December 7, 1948, to one of us.

A few examples of the various materials which can be incorporated prior to commencing step (2) include titanium dioxide, carbon black, barium sulfate, ferric oxide, cotton fibers, metallic powders, granulated mineral fillers such as mica, etc.

The second step for producing the synthetic resin of this invention is advantageously carried out at a temperature of from about 100° to about 150° C. although higher or lower temperatures can also be employed. The higher temperatures (such as 170° C.) may result in some discoloration of the product or otherwise may be less desirable, especially when such a temperature may adversely affect the stability of one or more of the components being heated. Lower temperatures can be employed but usually necessitate the use of an excessive period of time.

The polymerization catalysts of the type employed in the melt polymerization of ethylenically unsaturated organic compounds which are used in carrying out the second step of the process are well known in the art. The inventors do not know of any of these catalysts which cannot be employed. There is no reason to suppose that any of them would not perform with a reasonable degree of satisfaction. Examples of such catalysts include the peroxy type of catalysts, the azo type of catalysts, the metallo-organic type of catalysts, radiation as a catalyst, etc. Thus, any of the catalysts which are suited for the melt polymerization of ethylenically unsaturated compounds can be advantageously employed. Specific examples include benzoyl peroxide, acetyl peroxide, cobalt naphthenate, lauroyl peroxide, diethyl peroxide, peracetic acid, magnesium peroxide, sodium perborate, potassium percarbonate, ammonium perphosphate, hydrogen peroxide, azo-bis-isobutyronitrile, etc.

In addition to the chemical polymerization catalysts, it is also possible to employ ultraviolet or actinic light in order to promote the velocity and extent of the reaction. Bombardment with other forms of radiation can also be used as the catalyst.

The curing step is conducted for a long enough period of time to produce a solid material which is cross-linked and insoluble in the usual organic solvents such as dioxane, etc.

The products of this invention are especially advantageous in the preparation of coating materials such as films or sheets which can be employed separately as in wrapping materials or in combination with other sheets in the form of laminates, containers, etc. Moreover, the compositions or the synthetic resins of this invention can be impregnated into various types of organic and inorganic fabrics prior to performing step (2) so that the finally cured synthetic resin completely surrounds the fabric on both sides or may only penetrate partly into the surface of one side of the fabric. Heavier sheets of the synthetic resin of this invention can be used to make containers of various shapes which can be transparent having various colors or which can contain any of the usual pigments so as to produce opaque or translucent products. The synthetic resins of this invention are especially suited for the preparation of protective coatings for numerous articles of commerce and are unusually tough, insoluble, and can withstand extensive exposure to severe conditions of wear and tear.

This invention can be further illustrated by the following examples of preferred embodiments although it will be understood that these examples are included merely for purposes of illustration and are not intended to limit the scope of the invention unless otherwise specifically indicated.

*Example 1*

Seven grams (0.05 mol) of the 5-lactone of 3,5-dimethyl-5-hydroxy-2-hexenoic acid, 1.53 g. (0.0167 mol) of glycerol, and 0.1 g. of zinc chloride were heated at 200° C. for three hours. One-tenth percent by weight of cobalt naphthenate was mixed with reaction product. The resulting material was coated on a glass plate and heated at 110–115° C. for three hours. A tough film resulted. The film was insoluble, showing that it was cross-linked. It was subjected to abrasive tests and exposure to the weather and found to possess excellent toughness and durability.

*Example 2*

Seven grams (0.05 mol) of the 5-lactone of 3,5-dimethyl-5-hydroxy-2-hexenoic acid, 1.55 g. (0.025 mol) of ethylene glycol, 20 ml. of dioxane, and 0.1 g. of p-toluenesulfonic acid were refluxed for six hours. The dioxane was evaporated on the steam bath and the residue was washed with dilute sodium bicarbonate solution. Five-tenths percent by weight of benzoyl peroxide was mixed with the reaction product. The resulting material was coated on a glass plate and heated at 130° C. for two hours. A light colored, tough film resulted. The film was insoluble in dioxane and possessed a high degree of toughness and durability.

*Example 3*

Seven grams (0.05 mol) of the 5-lactone of 3,5-dimethyl-5-hydroxy-2-hexenoic acid, 4.1 g. (0.025 mol) of glycerine monobutyrate, and 0.1 g. of zinc chloride were heated at 180° C. for four hours. Two grams of carbon black and 0.05 g. of benzoyl peroxide were added and the ingredients were thoroughly mixed. Some of this mixture was coated on a glass plate and heated at 110° C. for three hours. An insoluble film was produced having excellent quality. More of this mixture was coated onto a prepared glass plate from which it was stripped after heating, thereby giving a tough, durable sheet.

*Example 4*

Seven grams (0.05 mol) of the 5-lactone of 3,5-dimethyl-5-hydroxy-2-hexenoic acid, 2.65 g. (0.025 mol) of diethylene glycol, 30 ml. of diamyl ether, and 0.05 g. of sulfuric acid were refluxed for three hours. This material was washed with a dilute sodium carbonate solution. The ether was removed under vacuum. To this material was added 3 g. of diisobutyl fumarate and 0.1 g. of benzoyl peroxide. Some of this mixture was coated on a glass plate and heated at 110–120° C. for three hours. A tough film resulted. As in Example 3, sheets of this material were formed which possessed excellent qualities. More of this mixture was used to impregnate glass cloth which was then partially cured, cut into sheets and built into a laminate which was further cured to form a rigid, durable construction material.

Example 3 was repeated exactly except for the use of an equivalent mol quantity of glycerine monolinoleate in lieu of the 0.025 mol of the monobutyrate. The product was essentially the same. The processes described in the various working examples have been performed using other catalysts, temperatures, modifiers and variations within the scope defined in this specification hereinabove.

The 5-lactone of 3,5-dimethyl-5-hydroxy-3-hexenoic acid is described by Young in J. Am. Chem. Soc., 71, 1346 (1949). The isomerization of such a lactone can be accomplished as described by Young in the sixth paragraph following his heading "Experimental" on page 1347.

We claim:

1. A synthetic resin prepared by the process comprising the steps of (1) reacting the 5-lactone of 3,5-dimethyl-5-hydroxy-2-hexenoic acid with a polyhydric alcohol containing from 2 to 6 free hydroxyl radicals and containing from 2 to 6 carbon atoms at an elevated temperature employing an acidic esterification catalyst, and (2) adding a polymerization catalyst of the type used for melt polymerization of ethylenically unsaturated organic compounds selected from the group consisting of peroxy compounds, azo compounds and metallo-organic compounds, and heating at an elevated temperature until a solid synthetic resin is produced.

2. A synthetic resin as defined in claim 1 wherein step (1) is performed at a temperature of from about 70° to about 220° C. and using from about 0.9 to about 1.1 mol proportions of the lactone for each mol proportion of hydroxyl groups in the polyhydric alcohol, and step (2) is performed at a temperature of from about 100° C. to about 150° C.

3. A synthetic resin as defined in claim 2 wherein the polyhydric alcohol is glycerol.

4. A synthetic resin as defined in claim 2 wherein the polyhydric alcohol is ethylene glycol.

5. A synthetic resin as defined in claim 2 wherein the polyhydric alcohol is glycerine monobutyrate.

6. A synthetic resin as defined in claim 2 wherein the polyhydric alcohol is diethylene glycol.

7. A synthetic resin as defined in claim 2 wherein the polyhydric alcohol is glycerine monolinoleate.

8. A film of a solid synthetic resin defined in claim 1 wherein step (2) is performed while the intermediate composition is in the form of a fluid film.

9. A film of a solid synthetic resin defined in claim 2 wherein step (2) is performed while the intermediate composition is in the form of a fluid film.

No references cited.